3,074,317
ZOOM LENS

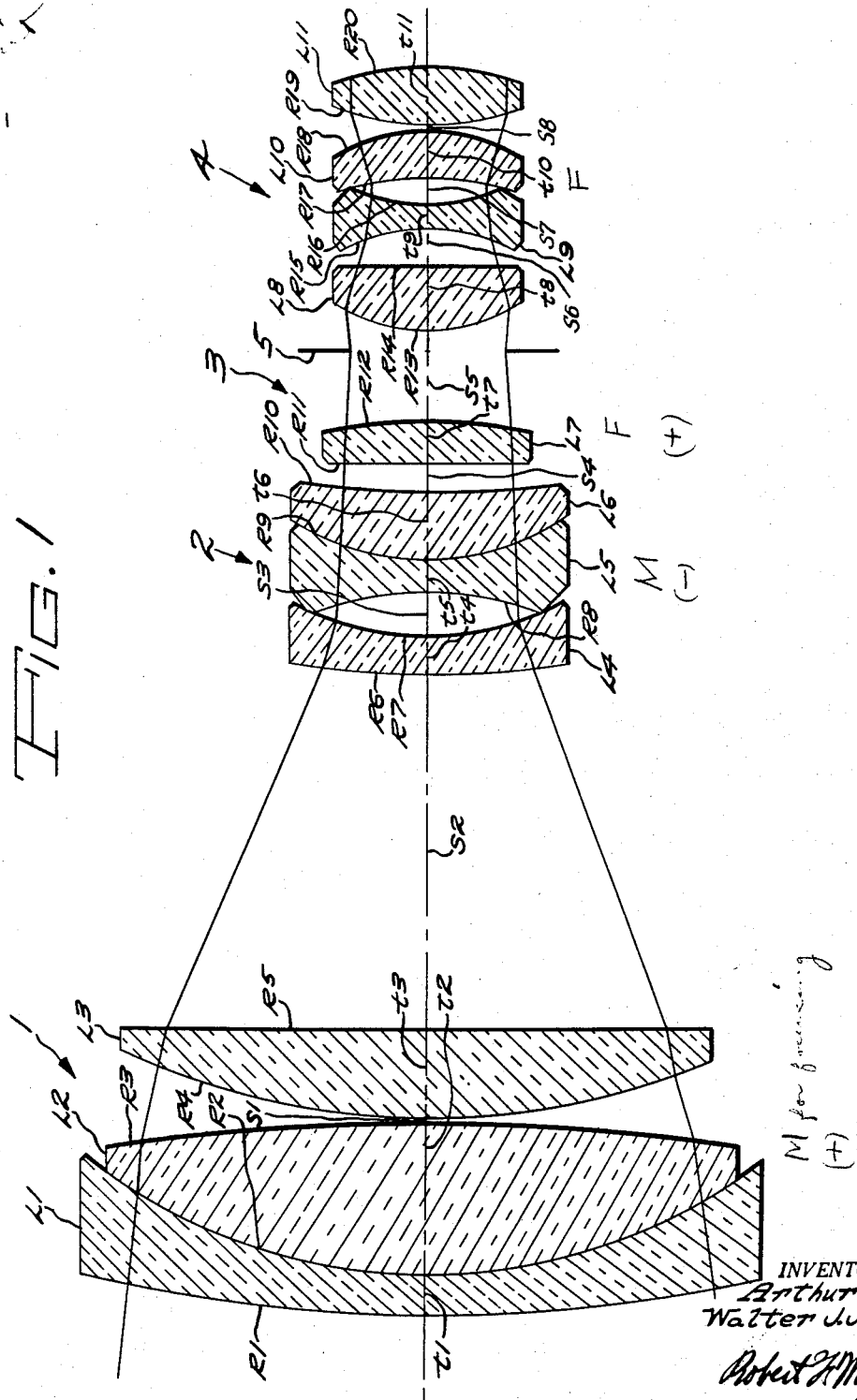

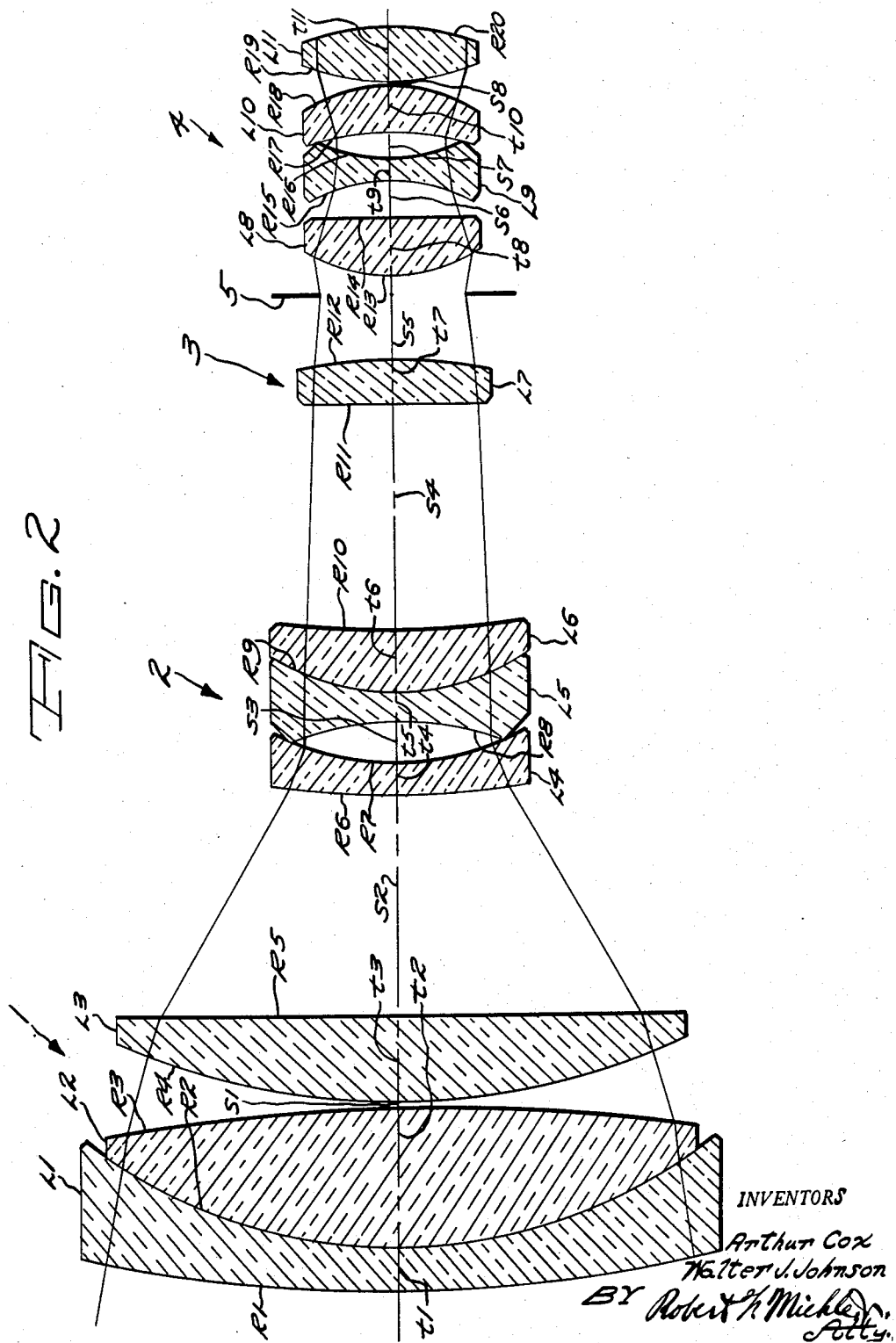

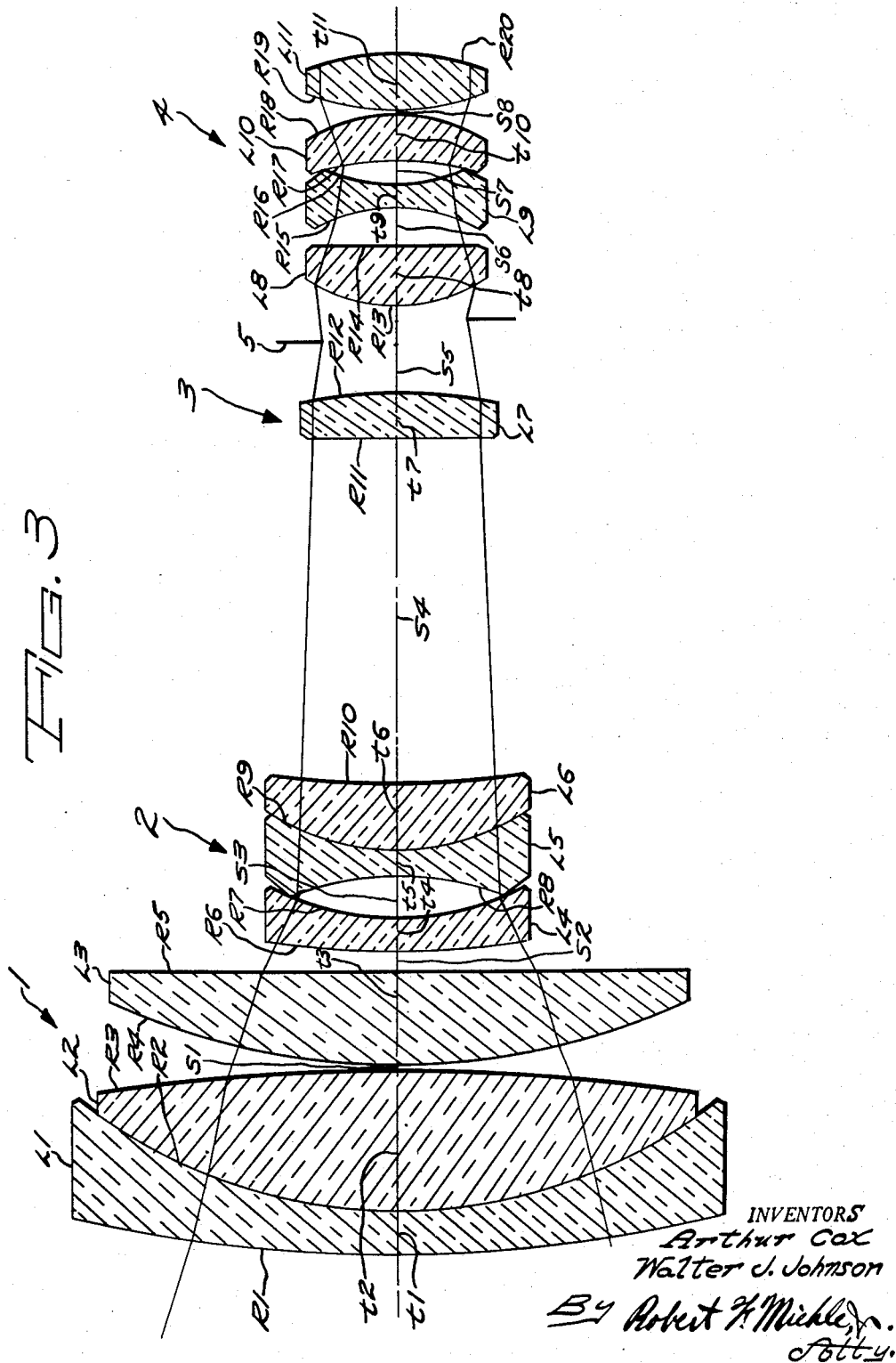

Arthur Cox, Park Ridge, and Walter J. Johnson, Mundelein, Ill., assignors to Bell & Howell Company, Chicago, Ill., a corporation of Illinois
Filed Dec. 24, 1959, Ser. No. 861,957
2 Claims. (Cl. 88—57)

This invention relates to a zoom lens, and more particularly to a zoom lens highly corrected over a large range of magnification.

An object of the invention is to provide a zoom lens highly corrected over a large range of magnification.

Another object of the invention is to provide an inexpensive zoom lens highly corrected over a magnification range of at least three to one.

It is to be understood that the terms "front" and "rear" as herein used refer to the ends of the objective respectively nearer the long and short conjugates thereof.

In the accompanying drawings froming a part hereof, FIGS. 1 to 3 illustrate a zoom lens described herein and embodying the invention, and respectively show the objective in the long, median or intermediate, and short variable equivalent focal length adjustments thereof.

The invention provides a zoom lens or variable equivalent focal length objective having a front positive member, an intermediate negative member and a rear positive member. The front positive member is movable non-linearly during zooming and preferably is adjustable for focusing also. The intermediate negative member is movable linearly for zooming, and the rear member is fixed. Preferably, the front member includes a front positive doublet and a rear positive singlet, the intermediate negative member has a front negative meniscus singlet and a biconcave rear doublet, and the rear member comprises a rear prime lens group and a front singlet separated by a stop from the prime lens group and forming an afocal system with the front and intermediate members. The afocal system preferably is undercorrected for astigmatism and the prime lens group is overcorrected for astigmatism to balance out the residual astigmatism of the afocal system. In an alternate embodiment, the front member may be movable only for focusing and the rear singlet of the afocal system may be moved non-linearly for focus compensation during zooming.

Referring now in detail to the drawings, the zoom lens shown therein includes a front lens member 1, an intermediate lens member 2 and a rear lens member made up of a component or member 3 and a prime lens or member 4 with a stop 5 positioned between the members 3 and 4. The members 3 and 4 are stationary or fixed, and, during zooming, the member 1 is moved non-linearly relative thereto, first moving to the left from its extreme telephoto position shown in FIG. 1 until it reaches the position thereof shown in FIG. 2, which is the intermediate zooming position of unit magnification, and then moves to the right to its extreme wide angle position as shown in FIG. 3. The member 1 also is adjustable relative to the members 2, 3 and 4 for focusing for different object distances, and any focus of the zoom lens for any setting of the member 1 is correct for all zooming positions. During zooming, the member 2 is movable linearly relative to the member 1 from its extreme telephoto position of FIG. 1 to its extreme wide angle position of FIG. 3. A suitable lens mounting and zooming structure for the objective disclosed herein is disclosed and claimed in copending application Serial No. 854,732, filed November 23, 1959, by F. W. Mellberg and assigned to the common assignee.

The front member 1 comprises a front biconvex, cemented doublet $L_1$—$L_2$ and a rear singlet $L_3$ predominantly convex forwardly and spaced closely to the doublet $L_1$—$L_2$, and having a dispersive internal contact surface $R_2$. The mean refractive index of the lens $L_1$ exceeds that of the lens $L_2$. The linearly movable negative zooming member 2 comprises a front negative meniscus singlet $L_4$ convex forwardly and a rear biconcave, cemented doublet component $L_5$—$L_6$ predominantly concave forwardly. The doublet $L_5$—$_6$ has a collective internal contact surface $R_9$ and the mean refractive index of the lens $L_6$ exceeds that of the lens $L_5$. The stationary member 3 is a positive singlet $L_7$ predominantly convex rearwardly, and forms an afocal lens system with the members 1 and 2, it being possible to use this afocal system as an attachment or built in with the prime lens member 4 or with other prime lenses. The prime lens member 4 behind the stop 5 includes a front positive singlet $L_8$ predominantly convex forwardly, a biconcave singlet $L_9$ predominantly concave forwardly, a positive meniscus singlet $L_{10}$ concave forwardly and a rear biconvex singlet $L_{11}$. The prime lens shown is a 15.2 mm. $f/1.8$ objective and is overcorrected to balance out aberrations in the afocal zooming system, astigmatism primarily being balanced out, the afocal zooming system being slightly undercorrected in astigmatism, which undercorrection is uniform throughout the zooming range. The lenses $L_1$ to $L_{11}$ have spherical surfaces or radii of curvature $R_1$ to $R_{20}$, axial thicknesses $t_1$ to $t_{11}$ and axial separations $s_1$ to $s_9$. The separation $s_5$ of the components $L_7$ and $L_8$ is sufficient to provide clearance for the stop 5 and a known filter member (not shown) which may be selectively inserted into and removed from the space between the components $L_7$ and $L_8$.

The equivalent focal length of the lens described is variable over a three to one range of magnification while maintaining a high degree of optical correction for a large aperture of at least $f/1.8$ throughout the range. Spherical aberration, coma, astigmatism, field curvature and axial and lateral color are highly corrected throughout both the range of focus and the zooming range. Distortion also is highly corrected but is slightly compromised in order to effect the high degree of correction of the other aberrations, the distortion being compromised at about three and one-half percent in the example shown.

In order to obtain the high corrections and minimize primary and higher order aberrations, the afocal position comprising the members 1, 2 and 3 should be constructed in substantial compliance with the following inequalities:

$$+1.5f_1 < R_1 < +2.5f_1$$
$$-20f_1 < -R_3 < +4f_1$$
$$+.65f_1 < R_4 < +.85f_1$$
$$-2.5f_1 < -R_5 < +20f_1$$
$$-4.0f_2 < R_6 < -7.0f_2$$
$$-.9f_2 < R_7 < -1.1f_2$$
$$-1.1f_2 < R_8 < -1.3f_2$$
$$-10.0f_2 < R_{10} < \text{Plano}$$

where $f_1$ is the equivalent focal length of the member 1 and $f_2$ is the equivalent focal length of the member 2.

A preferred example of the zoom lens having a magnification range of three to one is constructed in conformity with the following table wherein dimensions are in terms of inches and the refractive indices for the sodium D line and the Abbe dispersion numbers are respectively designated at $n_d$ and V:

[E.F.L. = 1.059 (Fig. 1) Telephoto; .612 (Fig. 2) Median; .355 (Fig. 3) Wide Angle. f/1.8]

[B.F.L. = .430]

| | | | | |
|---|---|---|---|---|
| $L_1$ | $R_1=+4.001$ | $t_1=.090$ | $n_d=1.720$ | $V=29.3$ |
| | $R_2=+1.150$ | | | |
| $L_2$ | | $t_2=.300$ | $n_d=1.611$ | $V=58.8$ |
| | $R_3=-12.853$ | | | |
| | | $s_1=.006$ | | |
| | $R_4=+1.540$ | | | |
| $L_3$ | | $t_3=.200$ | $n_d=1.611$ | $V=58.8$ |
| | $R_5=$Plano | | | |
| | | $s_2=.730$ (Fig. 1) Telephoto; .480 (Fig. 2) Median; .050 (Fig. 3) Wide Angle | | |
| | $R_6=+3.650$ | | | |
| $L_4$ | | $t_4=.065$ | $n_d=1.620$ | $V=60.3$ |
| | $R_7=+.585$ | | | |
| | | $s_3=.095$ | | |
| | $R_8=-.7135$ | | | |
| $L_5$ | | $t_5=.060$ | $n_d=1.620$ | $V=60.3$ |
| | $R_9=+.585$ | | | |
| $L_6$ | | $t_6=.145$ | $n_d=1.751$ | $V=27.7$ |
| | $R_{10}=+7.500$ | | | |
| | | $s_4=.050$ (Fig. 1) Telephoto; .4815 (Fig. 2) Median; .7301 (Fig. 3) Wide Angle | | |
| | $R_{11}=$Plano | | | |
| $L_7$ | | $t_7=.090$ | $n_d=1.611$ | $V=58.8$ |
| | $R_{12}=-1.150$ | | | |
| | | $s_5=.280$ | | |
| | $R_{13}=+.390$ | | | |
| $L_8$ | | $t_8=.126$ | $n_d=1.697$ | $V=56.2$ |
| | $R_{14}=$Plano | | | |
| | | $s_6=.080$ | | |
| | $R_{15}=-.460$ | | | |
| $L_9$ | | $t_9=.050$ | $n_d=1.751$ | $V=27.7$ |
| | $R_{16}=+.460$ | | | |
| | | $s_7=.042$ | | |
| | $R_{17}=-.929$ | | | |
| $L_{10}$ | | $t_{10}=.105$ | $n_d=1.651$ | $V=55.8$ |
| | $R_{18}=-.372$ | | | |
| | | $s_8=.007$ | | |
| | $R_{19}=+.7019$ | | | |
| $L_{11}$ | | $t_{11}=.120$ | $n_d=1.620$ | $V=60.3$ |
| | $R_{20}=-.7019$ | | | |

While in the above example, the front member 1 is moved non-linearly for focus compensation during zooming, it is also contemplated to have the front member 1 stationary during zooming and achieving the focus compensation during zooming by moving the lens $L_7$ non-linearly. The front member 1 preferably would still be adjustable for focusing purposes but not during zooming operations.

While the invention is thus described, it is not wished to be limited to the precise details described, as changes may be readily made without departing from the spirit of the invention.

What is claimed is:

1. In a zoom lens, proceeding from front to rear, a front positive member movable non-linearly and including a biconvex front cemented doublet having a dispersive internal contact surface and a rear positive singlet predominantly convex forwardly, an intermediate negative zooming member movable linearly relative to the front member and including a front negative meniscus singlet convex forwardly and a biconcave rear cemented doublet predominantly concave forwardly and having a collective internal contact surface, a stationary third positive member comprising a positive singlet predominantly convex rearwardly and forming an afocal lens system with the front and zooming members, and a stationary rear prime lens including a stop wherein the astigmatism of the afocal zooming system is undercorrected substantially uniformly throughout the zooming range and the prime lens is overcorrected for astigmatism to balance out the undercorrection of the afocal zooming system, and being further characterized in that the zoom lens is constructed in substantial compliance with the following table in which dimensions are in terms of inches, $R_1$ to $R_{12}$ designate the respective radii of the surfaces of the afocal system, $t_1$ to $t_7$ the axial thicknesses, $s_1$ to $s_4$ the axial separations, $n_d$ the indices of dispersion for the sodium D line, and V the Abbe numbers:

[E.F.L.=1.059 (Telephoto); .612 (Median); .355 (Wide Angle). f/1.8]

[B.F.L.=.430]

| | | | | |
|---|---|---|---|---|
| $L_1$ | $R_1=+4.001$ | $t_1=.090$ | $n_d=1.720$ | $V=29.3$ |
| | $R_2=+1.150$ | | | |
| $L_2$ | | $t_2=.300$ | $n_d=1.611$ | $V=58.8$ |
| | $R_3=-12.853$ | | | |
| | | $s_1=.006$ | | |
| | $R_4=+1.540$ | | | |
| $L_3$ | | $t_3=.200$ | $n_d=1.611$ | $V=58.8$ |
| | $R_5=$Plano | | | |
| | | $s_2=.730$ (Telephoto); .480 (Median); .050 (Wide Angle) | | |
| | $R_6=+3.650$ | | | |
| $L_4$ | | $t_4=.065$ | $n_d=1.620$ | $V=60.3$ |
| | $R_7=+.585$ | | | |
| | | $s_3=.095$ | | |
| | $R_8=-.7135$ | | | |
| $L_5$ | | $t_5=.060$ | $n_d=1.620$ | $V=60.3$ |
| | $R_9=+.585$ | | | |
| $L_6$ | | $t_6=.145$ | $n_d=1.751$ | $V=27.7$ |
| | $R_{10}=+7.500$ | | | |
| | | $s_4=.050$ (Telephoto); .4815 (Median); .7301 (Wide Angle) | | |
| | $R_{11}=$Plano | | | |
| $L_7$ | | $t_7=.090$ | $n_d=1.611$ | $V=58.8$ |
| | $R_{12}=-1.150$ | | | |

2. In a zoom lens, proceeding from front to rear, a front positive member movable non-linearly and including a biconvex front cemented doublet having a dispersive internal contact surface and a rear positive singlet predominantly convex forwardly, an intermediate negative zooming member movable linearly relative to the front member and including a front negative meniscus singlet convex forwardly and biconcave rear cemented doublet predominantly concave forwardly and having a collective internal contact surface, a stationary third positive member comprising a positive singlet predominantly convex rearwardly and forming an afocal lens system with the front and zooming members, and a stationary rear prime lens including a stop and also having a front positive component, a second biconcave component, a third positive meniscus component and a rear biconvex component, the zoom lens being further characterized in being constructed in substantial compliance with the following table in which dimensions are in terms of inches, $R_1$ to $R_{20}$ designate the radii of curvature of the optical surfaces, $t_1$ to $t_{11}$ the axial thicknesses, $s_1$ to $s_8$ the axial separations, $n_d$ the indices of refraction for the sodium D line, and V the Abbe dispersion numbers:

[E.F.L.=1.059 (Telephoto); .612 (Median); .355 (Wide Angle). f/1.8]

[B.F.L.=.430]

| | | | | |
|---|---|---|---|---|
| $L_1$ | $R_1=+4.001$ | $t_1=.090$ | $n_d=1.720$ | $V=29.3$ |
| | $R_2=+1.150$ | | | |
| $L_2$ | | $t_2=.300$ | $n_d=1.611$ | $V=58.8$ |
| | $R_3=-12.853$ | | | |
| | | $s_1=.006$ | | |
| | $R_4=+1.540$ | | | |
| $L_3$ | | $t_3=.200$ | $n_d=1.611$ | $V=58.8$ |
| | $R_5=$Plano | | | |
| | | $s_2=.730$ (Telephoto); .480 (Median); .050 (Wide Angle) | | |
| | $R_6=+3.650$ | | | |
| $L_4$ | | $t_4=.065$ | $n_d=1.620$ | $V=60.3$ |
| | $R_7=+.585$ | | | |
| | | $s_3=.095$ | | |
| | $R_8=-.7135$ | | | |
| $L_5$ | | $t_5=.060$ | $n_d=1.620$ | $V=60.3$ |
| | $R_9=+.585$ | | | |

[E.F.L.=1.059 (Telephoto); .612 (Median); .355 (Wide Angle). f/1.8] [B.F.L.=.430]—Continued

| | | | | |
|---|---|---|---|---|
| $L_6$ | $R_{10}=+7.500$ | $t_6=.145$ | $n_d=1.751$ | $V=27.7$ |
| | | $s_4=.050$ (Telephoto); .4815 (Median); .7301 (Wide Angle) | | |
| $L_7$ | $R_{11}=$Plano | $t_7=.090$ | $n_d=1.611$ | $V=58.8$ |
| | $R_{12}=-1.150$ | $s_5=.280$ | | |
| $L_8$ | $R_{13}=+.390$ | $t_8=.126$ | $n_d=1.697$ | $V=56.2$ |
| | $R_{14}=$Plano | $s_6=.080$ | | |
| $L_9$ | $R_{15}=-.460$ | $t_9=.050$ | $n_d=1.751$ | $V=27.7$ |
| | $R_{16}=+.460$ | $s_7=.042$ | | |
| $L_{10}$ | $R_{17}=-.929$ | $t_{10}=.105$ | $n_d=1.651$ | $V=55.8$ |
| | $R_{18}=-.372$ | $s_8=.007$ | | |
| $L_{11}$ | $R_{19}=+.7019$ | $t_{11}=.120$ | $n_d=1.620$ | $V=60.3$ |
| | $R_{20}=-.7019$ | | | |

References Cited in the file of this patent
UNITED STATES PATENTS

| | | |
|---|---|---|
| 2,847,907 | Angenieux | Aug. 19, 1958 |
| 2,937,572 | Yamaji | May 24, 1960 |